H. C. STUART.
Sulky-Plow.
No. 223,186. Patented Dec. 30, 1879.
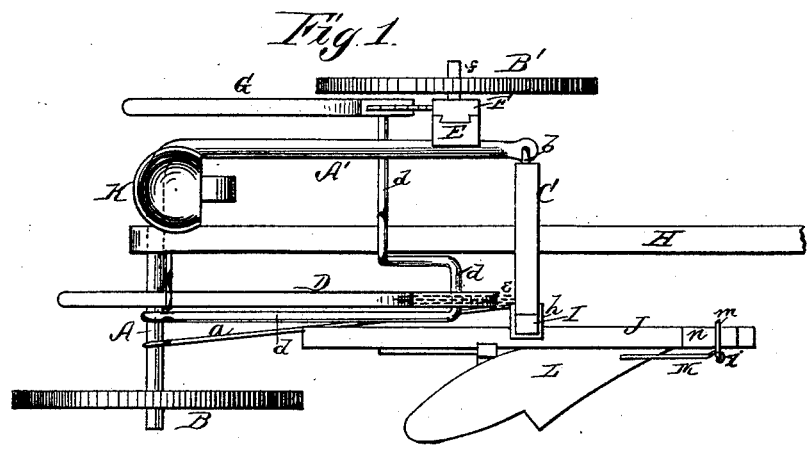
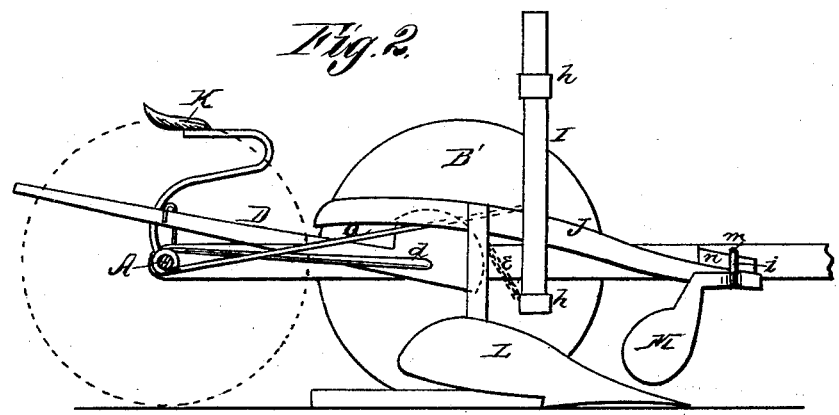
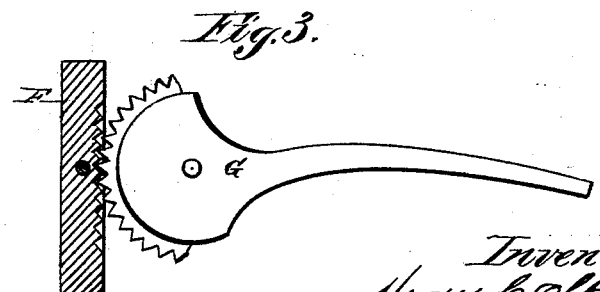
Witnesses:
W. C. McArthur
Columbus D. Choate
Inventor
Henry C. Stuart
per
T. H. Alexander & Elliott
Attorneys.

UNITED STATES PATENT OFFICE.

HENRY C. STUART, OF WARRENTON, MISSOURI.

IMPROVEMENT IN SULKY-PLOWS.

Specification forming part of Letters Patent No. 223,186, dated December 30, 1879; application filed October 28, 1879.

*To all whom it may concern:*

Be it known that I, HENRY C. STUART, of Warrenton, in the county of Warren and State of Missouri, have invented certain new and useful Improvements in Sulky-Plows; and I do hereby declare that the following is a full, clear, and exact description thereof, reference being had to the accompanying drawings, and to the letters of reference marked thereon, which form part of this specification.

The nature of my invention consists in the construction and arrangement of a sulky-plow, as will be hereinafter more fully set forth.

In order to enable others skilled in the art to which my invention appertains to make and use the same, I will now proceed to describe its construction and operation, referring to the annexed drawings, in which—

Figure 1 is a plan view; Fig. 2, a side elevation with one wheel removed; and Fig. 3 is a detail view of the cogged lever.

A represents the axle, provided on one end, at the right side, with the wheel B. The left end of the axle is bent forward at right angles, forming the arm A', and the front end of this arm is attached to one side of an upright frame, C, the other side of which is supported by means of a brace, $a$, extending from the main part of the axle. The end of the axle-arm A' forms an eye, through which passes an upright rod, $b$, attached to the side of the frame C, so that said frame can be moved up and down by means of a lever, D, pivoted upon a brace, $d$. The lever D is by a chain, $e$, connectes with the lower end of the frame C, and that part of the lever where said chain attaches is made cam-shaped, so as to raise or lower the frame by the turning of the lever.

To the side of the axle-arm A' is secured a vertical guide, E, in which moves a slide, F, having a spindle, $f$, projecting therefrom, and on this spindle is placed the left-hand wheel B'. The slide F is operated by means of a cogged lever, G, also pivoted on the brace $d$, so as to raise or lower the wheel B', as required.

H is the tongue, passing through the vertical frame C and connecting with the main part of the axle A. K is the driver's seat, also secured to said part of the axle.

In keepers $h$ $h$, at the right side of the frame C, is placed an upright, I, to which the plow-beam J is firmly secured. L is the plow, of any suitable construction, secured to said beam.

M is the colter, pivoted to an arm, $i$, attached to or forming part of a clip, $m$, which is placed around the plow-beam. The colter may be raised or lowered by means of a key, $n$, sliding on the beam.

By means of the lever D the vertical frame C may be raised or lowered for throwing the plow in or out of the ground.

Having thus fully described my invention, what I claim as new, and desire to secure by Letters Patent, is—

1. The combination of the axle A, with arm A', having an eye in its end, the vertical frame C, with side rod, $b$, the brace $d$, lever D, and chain $e$, substantially as and for the purposes herein set forth.

2. The combination of the vertical adjustable frame C, keepers $h$ $h$, upright I, with plow-beam attached thereto, and the lever D, as and for the purposes herein set forth.

In testimony that I claim the foregoing as my own I affix my signature in presence of two witnesses.

HENRY C. STUART.

Witnesses:
A. D. DALARSH,
ANCEL C. CLARK.